(12) United States Patent
Li et al.

(10) Patent No.: US 11,544,625 B2
(45) Date of Patent: Jan. 3, 2023

(54) COMPUTING SYSTEM FOR TRAINING, DEPLOYING, EXECUTING, AND UPDATING MACHINE LEARNING MODELS

(71) Applicant: Microsoft Technology Licensing, LLC, Redmond, WA (US)

(72) Inventors: Paul Luo Li, Redmond, WA (US); Ho Jeannie Chung, Seattle, WA (US); Xiaoyu Chai, Bellevue, WA (US); Irina Ioana Niculescu, Redmond, WA (US); Minsuk Kang, Redmond, WA (US); Brandon H. Paddock, Seattle, WA (US); Jilong Liao, Issaquah, WA (US); Neeraja Abburu, Sammamish, WA (US); James Henry Dooley, IV, Bellevue, WA (US); Frederick Douglass Campbell, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 404 days.

(21) Appl. No.: 16/780,853

(22) Filed: Feb. 3, 2020

(65) Prior Publication Data

US 2021/0241167 A1 Aug. 5, 2021

(51) Int. Cl.
*G06N 20/00* (2019.01)
*G06F 8/65* (2018.01)
*G06F 8/60* (2018.01)

(52) U.S. Cl.
CPC ............. *G06N 20/00* (2019.01); *G06F 8/65* (2013.01); *G06F 8/60* (2013.01)

(58) Field of Classification Search
CPC ............. G06N 20/00; G06F 8/65; G06F 8/60
See application file for complete search history.

(56) References Cited

U.S. PATENT DOCUMENTS 5,999,740 A 12/1999 Rowley
6,934,748 B1 8/2005 Louviere et al.
(Continued)

OTHER PUBLICATIONS

Dona Sarkar, Announcing Windows 10 Insider Preview Build 17723 and Build 18204, Jul. 25, 2018,Microsoft windows blogs, https://blogs.windows.com/windows-insider/2018/07/25/announcing-windows-10-insider-preview-build-17723-and-build-18204/, p. 10 (Year: 2018).*

(Continued)

*Primary Examiner* — Bryce P Bonzo
*Assistant Examiner* — Michael Xu

(57) ABSTRACT

A server computing device generates training data based upon an identifier for a device, a timestamp, and a label received from a developer computing device. The server computing device trains a computer-implemented machine learning (ML) model based upon the training data. The server computing device also generates client configuration data for the ML model that specifies transformations that are to be applied to values in order to generate input values for the ML model. The server computing device deploys ML assets to client computing devices, the ML assets comprising the ML model and the client configuration data. The client computing devices execute the ML model using input values derived via transformations of (local) values produced by the client computing devices and transmit telemetry data to the server computing device. The server computing device updates the ML assets based upon the telemetry data.

20 Claims, 9 Drawing Sheets

(56) References Cited

U.S. PATENT DOCUMENTS

| | | | |
|---|---|---|---|
| 7,024,471 B2 | 4/2006 | George et al. | |
| 7,251,812 B1 | 7/2007 | Jhanwar et al. | |
| 7,308,497 B2 | 12/2007 | Louviere et al. | |
| 7,496,910 B2 | 2/2009 | Voskuil | |
| 7,913,246 B2 | 3/2011 | Hammond et al. | |
| 7,975,000 B2 | 7/2011 | Dixon et al. | |
| 8,166,155 B1 | 4/2012 | Rachmeler et al. | |
| 8,341,617 B2 | 12/2012 | Bunn | |
| 9,003,387 B2* | 4/2015 | Van Camp | G06F 8/65 717/170 |
| 9,391,861 B1 | 7/2016 | Odean et al. | |
| 9,737,815 B2 | 8/2017 | Dhawan et al. | |
| 10,063,490 B2 | 8/2018 | Wang et al. | |
| 2018/0032915 A1* | 2/2018 | Nagaraju | G06V 10/94 |
| 2019/0272479 A1* | 9/2019 | Mars | G06N 20/00 |
| 2020/0235998 A1* | 7/2020 | Madhavan | H04L 43/106 |
| 2020/0279140 A1* | 9/2020 | Pai | G06F 11/3447 |
| 2021/0097439 A1* | 4/2021 | Vodencarevic | G06F 8/71 |
| 2021/0117818 A1* | 4/2021 | Teng | A61B 5/1118 |
| 2021/0211863 A1* | 7/2021 | Vaizman | H04W 8/005 |
| 2021/0241177 A1* | 8/2021 | Wang | G06N 5/04 |

OTHER PUBLICATIONS

Bagdasaryan, et al., "How To Backdoor Federated Learning", Aug. 6, 2019, pp. 1-15.

Chen, et al., "Federated Meta-Learning with Fast Convergence and Efficient Communication", Dec. 14, 2019, pp. 1-14.

Konečný, et al., "Federated Learning: Strategies For Improving Communication Efficiency", Oct. 30, 2017, pp. 1-10.

"Amazon EC2", Retrieved from: https://web.archive.org/web/20191212193244/https://aws.amazon.com/ec2/, Dec. 12, 2019, 13 Pages.

"Azure. Invent with Purpose", Retrieved from: https://web.archive.org/web/20200101035242/https://azure.microsoft.com/en-us/, Jan. 1, 2020, 23 Pages.

"Google Cloud Customers", Retrieved from: https://web.archive.org/web/20200109083650/https://cloud.google.com/customers/, Jan. 9, 2020, 9 Pages.

Bernardi, et al., "150 Successful Machine Learning Models: 6 Lessons Learned at Booking. com", In Proceedings of the 25th ACM SIGKDD International Conference on Knowledge Discovery & Data Mining, Aug. 4, 2019, pp. 1743-1751.

\* cited by examiner

COMPUTING SYSTEM FOR TRAINING, DEPLOYING, EXECUTING, AND UPDATING MACHINE LEARNING MODELS

BACKGROUND

Machine Learning (ML) is a category of computer-implemented technologies that enable a computing device to make predictions and/or inferences based upon values of features, wherein a developer need not explicitly specify how the values of the features relate to the resultant predictions. ML technologies are useful in situations where it is difficult to develop a conventional rules-based algorithm for making predictions and are becoming increasingly important in the development of software applications.

Conventionally, for a software developer to include ML-based functionality into a target application, the software developer identifies a type of ML model (e.g., a neural network, a regression tree, etc.) that is to be integrated into the target application. For instance, the developer may identify an output (i.e., a prediction) of the (to-be-generated) ML model, determine semantics about the actual meaning of the output, and then determine what input features to the ML model might be useful in producing the desired output. The developer can determine, based upon his/her intuition and experience, what type of ML model is most appropriate. The developer then determines features (sometimes referred to as "predictors") upon which the ML model is to be trained. Conventional software development platforms often fail to provide access to requisite training data for the ML model, wherein the training data includes a labeled output and values for the features upon which the ML model is to be trained. Accordingly, in enterprise settings, the developer may be forced to initiate a data collection program to allow for collection and labeling of data. Moreover, conventional software development platforms fail to provide technologies that can transform collected data into features desired by the developer. In an example, a feature of interest to the developer may be "number of mouse clicks over the last five minutes." While collected data may include mouse clicks and timestamps corresponding thereto, the collected data does not explicitly include the feature of interest to the developer; conventional software development platforms require that the developer construct an algorithm to transform collected data into values for features of interest.

Once a sufficient amount of training data has been acquired, a computing system trains the ML model based upon the training data. Once trained based upon such training data, the ML model, when provided with values for the features, outputs a label (i.e., a prediction) that is based on the values of the features. The computing system may evaluate performance of the ML model using evaluation data, and the developer may modify the ML model (e.g., by retraining the ML model with different training data, adding or removing features that are provided as input to the ML model, etc.) based upon his/her intuition and experience (or an application that provides an automated exploration) in an attempt to improve performance of the ML model such that the NIL model is more likely to output correct predictions.

As indicated above, conventional software development platforms suffer from various deficiencies with respect to constructing, deploying, and updating ML models. First, conventional software development platforms rely on the developer to have knowledge of ML model types, how ML models are trained, etc. For instance, conventionally, the developer must (without assistance) identify features that are to be used to train the ML model, transformations that are to be applied to collected data to obtain values for the features prior to training or evaluating the ML model, parameters of the ML model (e.g., a number of hidden layers in a Deep Neural Network, a number of branches in a regression tree, etc.), generate or identify ML libraries/runtimes to execute on client computing devices, and so forth. While certain applications have been developed that automate maintenance of ML runtimes/libraries, such applications do not include functionality that enables an ML model to be trained without the developer specifying at least some features. Second, certain features may be of high predictive value but may not be readily accessible to the developer and/or may not easily identified as relevant by the developer.

Third, when the ML model is deployed (e.g., placed on a client computing device operated by an end user), values for features that are to be provided as input to the ML model may not be readily available. Put differently, a log file generated by an operating system of the client computing device may include values for a first set of features; however, the ML model is not configured to receive values for the first set of features. Instead, the ML model may be configured to receive, as input, values for a second set of features that are derivations of the first set of features. Conventional software development platforms fail to provide technologies that assist the developer with transforming the first set of features into the second set of features when the ML model is deployed on client computing devices. As a result, conventionally, developers must implement their own retrieval and transformations for features, which can be error prone as it is difficult to ensure that features used in training the ML model match input features to the ML model when the ML model is deployed and evaluated in the context of a target application.

Fourth, conventional approaches for incorporating a ML model into a software application tend to require retrieval, processing, and transformation of features that have fixed definitions within the program code of the software applications. The program code tends to be separate from the code used to produce the feature set that is used to train the ML model. As a result, changes (e.g., additions, deletions) to the feature set require changes to the program code, which then has to be validated and deployed to client computing devices. This conventional approach is limiting and problematic as it does not provide a way to maintain consistent feature selection, processing, and formatting between the training inputs and the inputs used at run time. Moreover, having to change program code in order to change the feature set limits the ability to rapidly deploy and experimentally validate test variations of the feature set, or various candidate models which require differences in the feature set. The conventional approach is even more problematic when the ML model is trained on a server computing device (e.g., on a cloud-based computing platform), but deployed and used on client computing devices, as it is challenging to ensure that consistent feature engineering occurs on both the server-side and the client-side. Because of the aforementioned deficiencies, adoption of ML technologies in target applications has been slower than would otherwise be possible.

SUMMARY

The following is a brief summary of subject matter that is described in greater detail herein. This summary is not intended to be limiting as to the scope of the claims.

Disclosed herein are various technologies pertaining to training, deployment, execution, and updating of computer-implemented machine learning (ML) models. More specifically, a ML development platform is disclosed herein, wherein the ML development platform facilitates end-to-end development, deployment, and updating of ML models, wherein ML functionality provided by a ML model is integrated into a target application. This platform automates and extracts away many of the complexities of ML (e.g., feature identification, data transformations to acquire desired features, ML libraries/runtimes, and so forth).

In operation, a developer computing device operated by a software developer receives from the developer an indication that a ML model is to be built. The developer computing device additionally receives a scenario definition from the developer that identifies predictions that are to be output by the ML model. The ML development platform, in response to receipt of the scenario definition, assigns a unique scenario identifier to the scenario definition. Alternatively, the scenario identifier can be provided by the software developer so long as it is unique. For example, the developer may desire to construct a ML model that is configured to predict whether or not a user of a client computing device will interact with the client computing device within the next 90 minutes (wherein the client computing device can be restarted to install updates if the ML model predicts that the user will not interact with the client computing device within the next 90 minutes). The scenario definition can include a form and range of output that the ML model is to produce using conventional programming data types, such as Boolean, integer, an enumeration, or an enumeration of combinable flags. The ML development platform utilizes the output (e.g., Boolean, integer, etc.) to select a corresponding type of model from a set of supported model types. For example, the developer can specify that their scenario requires a Boolean value (true or false) as the output, in which case the ML development platform trains a binary classification model. Alternatively, if the developer specifies an enumeration, the system will produce a multiclass model where each class corresponds to an enumerated value. In an embodiment, the scenario definition can further (optionally) include a type of ML model that is to be constructed (e.g., neural network, deep neural network, recurrent neural network, decision tree, etc.). As noted above, the prediction is to be utilized by a target application in order for the target application to perform an action. In the example set forth above, the target application may be an operating system of a client computing device; in other examples, the target application can be a word processing application, a spreadsheet application, or any other suitable type of computer-executable application.

The ML development platform provides the developer computing device with access to a file or files for client computing devices, wherein the file(s) include data that represents states of the client computing devices at different times, and optionally identifiers for the client computing devices or users of the client computing devices. The developer selects a client computing device or a set of client computing devices from the file(s), wherein a client computing device selected by the developer is known to have encountered a state where a prediction would have been relevant to a scenario of interest. The developer additionally identifies a timestamp that corresponds to a state of the client computing device when it would have been useful to predict a certain outcome. The developer can select numerous client computing devices and also identify numerous timestamps corresponding to such devices. Further, for each identified timestamp, the developer assigns a label that identifies a desired outcome (i.e., the correct prediction, that is, a known value that should have been predicted or inferred at the provided timestamp). Continuing with the example set forth above, the developer can select a client computing device, can identify a timestamp, and can then label that timestamp with a value that defines whether a user of the client computing device interacted with the client computing device within 90 minutes of the identified timestamp. Additionally or alternatively, the ML development platform can support automatic assignation of labels for certain scenarios, for example, using the presence or absence of a later log entry, or by evaluating data provided in the later log entry. In the example set forth above, client computing devices and timestamps can be sampled from the file(s), and a label can be assigned to sampled timestamps based upon whether a respective user interacted with a client computing device within 90 minutes of the sampled timestamp. More specifically, the label can be assigned to sampled timestamps based upon whether log entries for the subsequent 90 minutes indicate that the respective user interacted with the client computing device.

The ML development platform, when a sufficient number of timestamps have had labels assigned thereto, can generate training data for training and validating a ML model. With more particularity, the ML development platform can support a predefined set of features that have been identified as being useful as predictors for a wide variety of scenarios, and the ML development platform can generate values for such features from the file(s) referenced above based upon the selected timestamps. Exemplary features include, but are not limited to, world state (date, time), device state (power source, connectivity), device characteristics (form factor, screen size), user characteristics (age, account type), user/operating system/application states (identity of an active application, identities of background applications, an amount of time since the user logged into the device), and user/operating system/application history (keystrokes, patterns of input, mouse clicks, etc.). It is to be understood that this set of features is not exhaustive and that the ML development platform can be extended to include more (or fewer) features in the set of features. Thus, for instance, the ML development platform can receive an identity of a client computing device and an identity of a timestamp selected by the developer. The ML development platform, based upon content of the file and the timestamp, generates values for the predefined set of features referenced above.

The ML development platform additionally generates model configuration data, where the model configuration data includes feature transformations and model training parameters. Feature transformations are sets of pre-defined operators that can be applied to the values for the predefined set of features to generate training values for training features. Exemplary pre-defined operators include, but are not limited to, a capping operator (that sets all values that are less than zero to zero), a summing operator (e.g., that is configured to add different values, such as mouse and keyboard activities), a dividing operator (e.g., that is configured to divide a number of keystrokes over a most recent one minute from the timestamp by a number of keystrokes over a most recent ten minutes from the timestamp), amongst other operators. The model training parameters can include information such as a number of training iterations, a number of nodes in a hidden layer, a number of hidden layers in a deep neural network, and the like.

Upon receiving the client computing device identities, timestamp identities, labels assigned to the timestamps, and the model configuration data, the ML development platform can perform the following actions: 1) for each label, generate values for the predefined set of features based upon contents of the files; 2) for each label, and using the feature transformations identified by the developer, generate values for training features (where the training features are derivations of the predefined set of features through use of the feature transformations); 3) train an ML model using the values for the training features based upon: a) the labels; b) the values of the training features respectively assigned to the labels; and c) the model training parameters (also known as hyperparameters). The ML development platform may also assign, to the ML model, a version identifier to enable comparison of different versions of the ML model trained at different times with different configurations. The version identifier is useful in establishing a feedback loop and enabling experimentation during training as well as after the ML model has been deployed to client computing devices. The ML development platform can evaluate the ML model and output diagnostic information with respect to the ML model, including generating Area Under Curve (AUC) and partial dependency plots, as well as generating data that is indicative of importance of training features to correct predictions. Based upon such diagnostic information, the ML development platform can update training features that are used to train the ML model and can retrain the ML model (until an ML model is generated that has sufficiently high prediction accuracy). The ML development platform can employ heuristics or other suitable approaches to identify training features that are to be used to train the ML model.

The ML development platform, upon the ML model being trained (and evaluated for accuracy), causes ML assets to be securely deployed to client computing devices that have the target application installed thereon, where the ML assets have the scenario identifier assigned thereto. These ML assets include client configuration data and the ML model. The client configuration data comprises identifiers for features from the predefined set of features that were used to train the ML model as well as feature transformations that transform such features into training features. The unique identifier (e.g., the scenario identifier) and the version identifier is also assigned to the client configuration data. The ML model may be, for instance, a Gradient Boosted Tree in Open Neural Network Exchange (ONNX) format. The ML assets may be securely deployed to the client computing devices as part of an operating system update to each of the client computing devices, as part of an update to the target application itself, as part of an update that is independent from the operation system update and the target application update, etc.

The developer, in the target application, can insert computer-executable code that calls a prediction Application Programming Interface (API) with the scenario identifier (which is also assigned to the ML assets). At a client computing device that has the ML assets loaded thereon, the target application, at runtime, makes an API call to the prediction API using the scenario identifier. Client ML code installed on the client computing device retrieves the ML assets based upon the scenario identifier, acquires values for the features identified in the client configuration data, transforms such values into input values using the feature transformations in the client configuration data such that the input values conform to expected inputs to the ML model, and provides the input values to the ML model as input. The ML code, for example, can acquire the values for the features based upon contents of a log file of the client computing device and/or contents in memory of the client computing device. The ML model outputs a prediction based upon the input values, and the ML code returns the prediction to the target application. The target application may then perform an action based upon the prediction output by the ML model. Notably, the prediction output by the ML model is based upon data that is local to the client computing device at the time the prediction is to be made. In this manner, the ML model can output the prediction even when there is no connection between the client computing device and a server computing device at the time the prediction is to be made. Furthermore, the ML assets can be deployed and/or updated independent of the code within the target application that calls the API.

The ML code on the client computing devices may be configured to transmit telemetry data pertaining to the prediction to a server computing device (e.g., the server computing device that provides the ML development platform), wherein the server computing device can evaluate and retrain the ML model based upon the telemetry data. This telemetry data includes values for the predefined set of features, an identity of the prediction output by the ML model, and user feedback (including ground truth values) collected about the prediction. The ML development platform can (automatically) retrain the ML model based upon telemetry data collected from client computing devices and redeploy ML assets based upon such retraining. Additionally, the ML development platform can re-evaluate the ML model based upon the received telemetry data from client computing devices, wherein training features can be added or removed, and updated diagnostic information can be generated.

The above-described technologies present various advantages over conventional approaches for developing ML models. First, unlike conventional technologies, the ML development platform described above enables software developers to more easily understand what they need about the broad subject of ML in order to integrate ML functionality into target applications. Thus, the ML development platform automates and expedites the process of creation of ML functionality, abstracting away complexities of the process. Second, unlike conventional technologies, the ML development platform facilitates identification of features that are used to train a ML model, as opposed to requiring the software developer to identify the features "from scratch". Third, the ML development platform enables a clear separation between the software developer implementing traditional functionality into a target application that will utilize the ML model, and a data engineer/data scientist/automated entity which selects, tunes, and prepare features that are utilized to train the ML model. Fourth, the ML development platform decouples feature selection and preparation from program code of the target application, allowing for the same version of the (compiled) program code of the target application to be tested or used with various NIL models. For instance, the ML development platform can cause A/B tests to be performed (either during training or after deployment) with different ML models or ML model configurations or the ML development platform can deploy different ML models to different segments of users or devices (e.g., deploy a first ML model to laptop computing devices and a second ML model to desktop computing devices) all without having to change the program code of a target application executing on the devices. Fifth, the ML development platform described above provides feature transformations that can be automatically deployed at client computing devices, where ML code installed on the client computing devices handles such transformations (instead of forcing the developer to develop custom transformations that ship as updates to target applications). Sixth, the client configuration data ensures consistent feature engineering between server-side and client-side aspects of the ML development platform described above.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
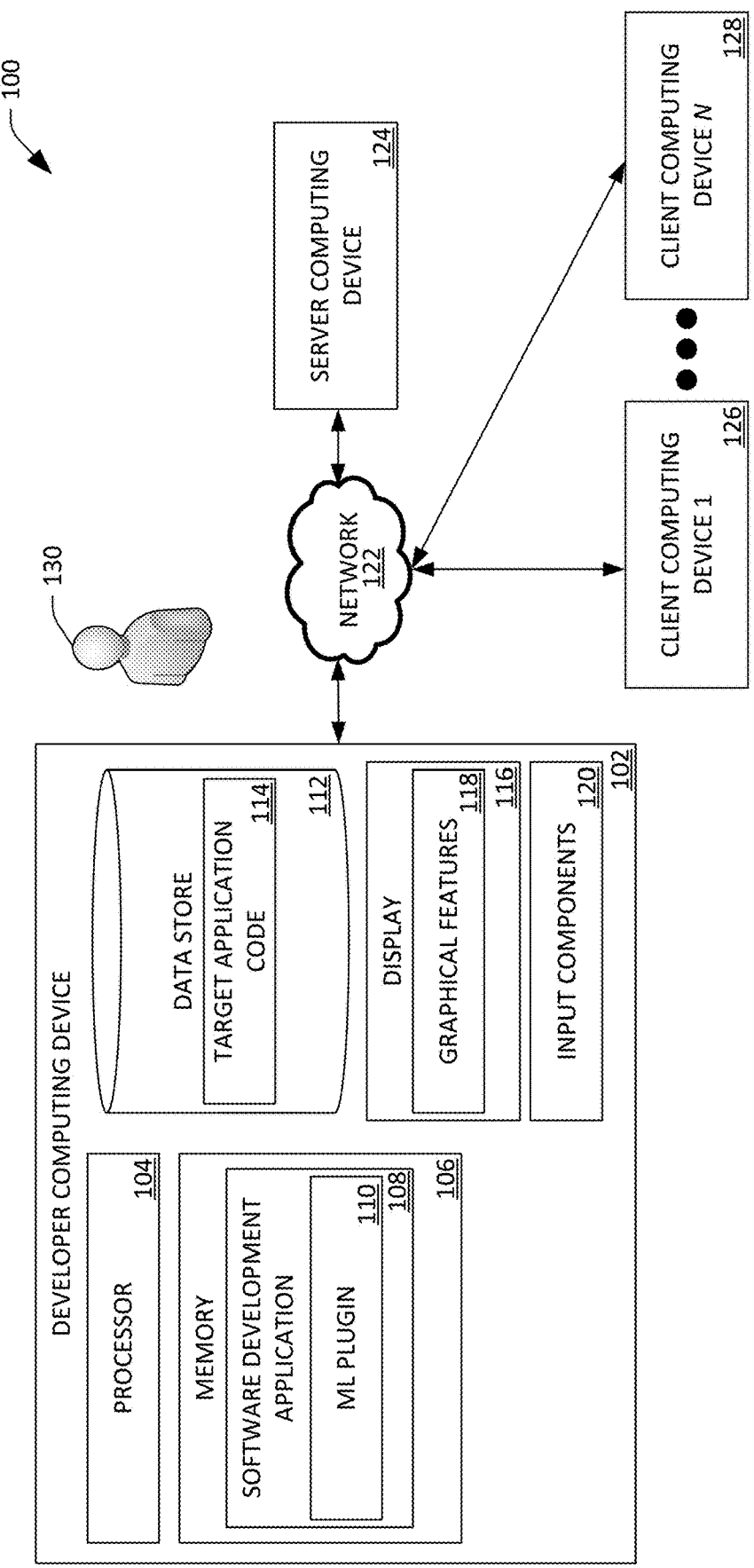
FIG. 1 is a functional block diagram of an exemplary computing system that facilitates training, deploying, executing, and updating machine learning (ML) models.

Various technologies pertaining to training, deploying, executing, and updating machine learning (ML) models are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", "module", and "application" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference to FIG. 1, an exemplary computing system 100 that facilitates training, deploying, executing, and updating ML models is illustrated. The computing system 100 includes a developer computing device 102 that is operated by a software developer 130. The developer computing device 102 comprises a processor 104 and memory 106, wherein the memory 106 has a software development application 108 loaded therein. The software development application 108 may be utilized by the software developer 130 to develop computer-executable applications. For instance, the software development application 108 may be or include an integrated development environment (IDE), a text editor, a shell, a software development kit (SDK), etc. The software development application 108 may include a ML plugin 110 which facilitates addition of ML functionality to an application being developed by the software developer 130 without requiring the software developer 130 to have extensive knowledge of ML technologies.

The developer computing device 102 further comprises a data store 112. The data store 112 comprises target application code 114 for a target application that is being developed by the developer 130 by way of the software development application 108. In an example, the target application may be an operating system, a word processing application, a spreadsheet application, an email application, or any other suitable type of application.

The developer computing device 102 may further comprise a display 116, wherein graphical features 118 may be presented thereon. For instance, the graphical features 118 may include a graphical user interface (GUI) for the software development application 108, a GUI for the target application 114, etc. In an embodiment, the display 116 may be a touchscreen. The developer computing device 102 also comprises input components 120 that enable the software developer 130 to set forth input to the developer computing device 102. For instance, the input components 120 may include a mouse, a keyboard, a trackpad, a scroll wheel, a touchscreen, a camera, a video camera, and/or a microphone.

The computing system 100 additionally includes a server computing device 124 that is in communication with the developer computing device 102 by way of a network 122 (e.g., an intranet). The computing system 100 further includes a plurality of client computing devices 126-128 that are in communication with the server computing device 124 by way of the network 122. While a single network 122 is illustrated, it is to be understood that computing devices in the computing system 100 may be in communication with one another by way of different networks.

Figures 2, 3:
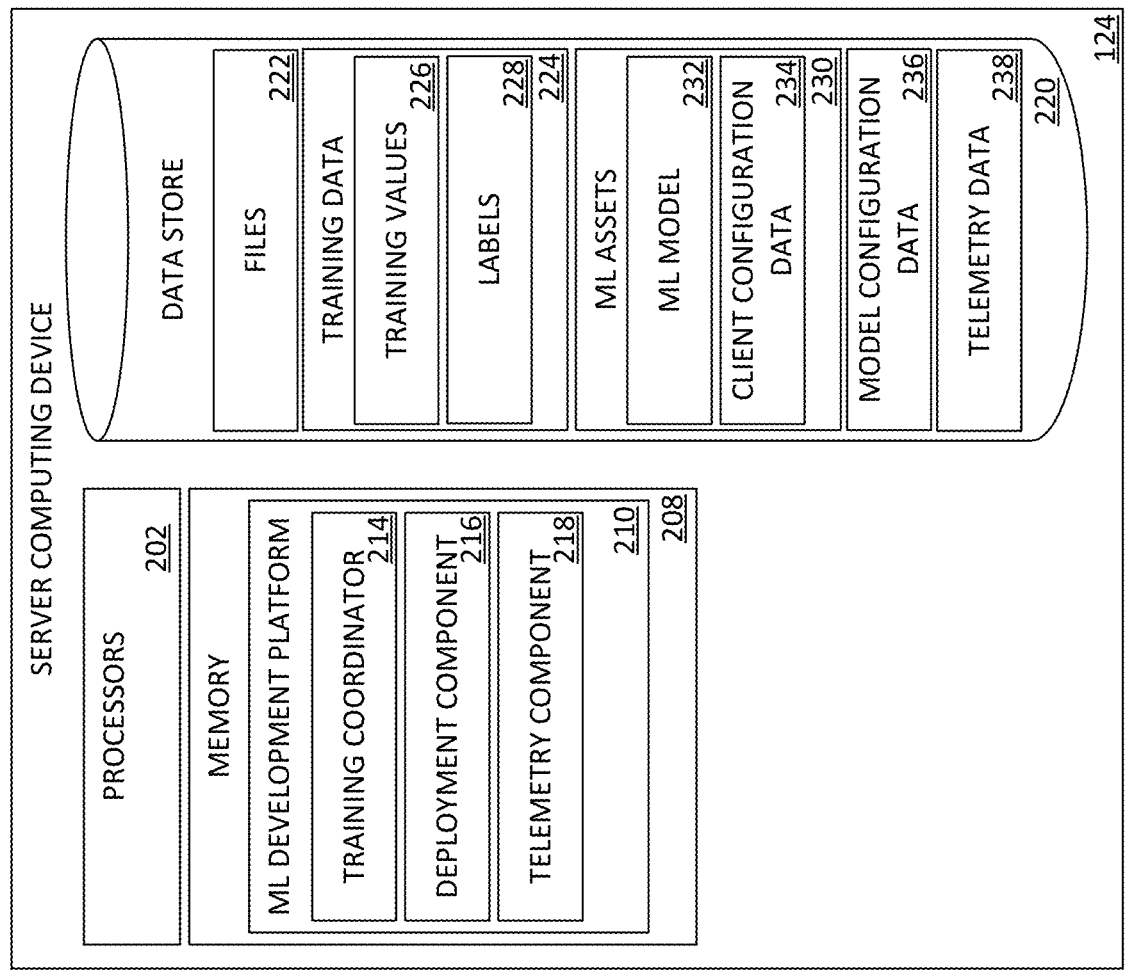
FIG. 2 is a functional block diagram of an exemplary computing system that facilitates training, deploying, executing, and updating ML models.
FIG. 3 is a functional block diagram of a training coordinator of an ML development platform.

Referring now to FIG. 2, componentry of the server computing device 124 is illustrated. The server computing device 124 may be included in a private cloud. The server computing device 124 comprises a processor 202 and memory 208, wherein the memory 208 has a ML development platform 210 loaded therein. As will be described in greater detail below, the ML development platform 210 is configured to train and deploy ML models.

The ML development platform 210 further includes a training coordinator 214. Referring briefly to FIG. 3, a functional block diagram of the training coordinator 214 is illustrated. The training coordinator 214 comprises a feature selector 302 that selects/deselects features from a predefined set of features, wherein a ML model is trained based upon selected features. The feature selector 302 may also retrieve values for the selected features. The training coordinator 214 further comprises a transformation module 304 that is configured to transform values of the predefined set of features into training values through use of operators in a predefined set of operators. The training coordinator 214 additionally comprises a training module 306 that is configured to train ML models based upon the training values and labels assigned thereto. The training coordinator 214 also comprises a diagnostic module 308 that is configured to output diagnostic information with respect to performance of ML models. For instance, the diagnostic information may include indications of features importance, Area Under Curve (AUC) curves, partial dependency plots, etc.

Referring back to FIG. 2, the ML development platform 210 further includes a deployment component 216. The deployment component 216 facilitates deployment of ML models and associated data onto different computing devices that are to execute the ML models. The ML development platform 210 also includes a telemetry component 218. The telemetry component 218 is configured to receive telemetry data from the different computing devices, the telemetry data being indicative of whether the ML models trained by the ML development platform 210 output correct predictions when executed by the different computing devices.

The server computing device 124 also comprises a data store 220. The data store 220 retains file(s) 222 that represent states of different computing devices at different times. In an example, the file(s) may include an identifier for a computing device (e.g., a client computing device), an identifier for a user of the computing device, hardware configurations of the computing device, software configurations of the computing device, indications of events that occurred on the computing device (e.g., patterns of input received, graphical data being displayed, error messages produced, and so forth), and timestamps for each of the events. As will be described in greater detail below, the ML development platform 210 utilizes the data in the file(s) 222 to generate training data that is used to train ML models.

The data store 220 also comprises training data 224, wherein the training data 224 comprising training values 226 and labels 228 assigned thereto. As will be described in greater detail below, the training values 226 are derived from data in the file(s) 222 and are utilized by the ML development platform 210 to train the ML model 232. The labels 228 are indicative of correct predictions associated with the training values 226. In an embodiment, the labels 228 may be automatically generated by the ML development platform 210. In another embodiment, the labels 228 may be manually set forth by the software developer 130 (and/or other human labelers).

The training values 226 and the labels 228 can correspond to different sets of values. In an example, a first set of training values may include a first training value and a second training value, wherein the first training value corresponds to a first feature and the second training value corresponds to a second feature. The first feature may be a number of mouse clicks received by a computing device within a time period, and, in an example, the first training value for the first feature may be "4." The second feature may be a number of keyboard strokes received by the computing device within the time period, and, in an example, the second training value may be "16." A label for the first set of training values may represent that a user utilizing the computing device was active during the time period (e.g., "1" using binary coding). In another example, a second set of training values may include a third training value and a fourth training value, wherein the third training value corresponds to the first feature (the number of mouse clicks during the time period) and the fourth training value corresponds to the second feature (the number of keyboard strokes during the time period). For instance, the third training value may be "0", and the fourth training value may also be "0". A label for the second set of training values may represent that a user the computing device was not active during the time period (e.g., "0" using binary coding).

The data store 220 also comprises ML assets 230, wherein the ML assets 230 comprise an ML model 232. As will be described in greater detail herein, the ML model 232, when executed by a processor, is configured to output a prediction based upon input to the ML model 232. In an example, the ML model 232 may be a decision tree, a gradient boosted tree (e.g., a gradient boosted tree in Open Neural Network Exchange (ONNX) format), an artificial neutral network (ANN), a support vector machine (SVM), a hidden Markov model, a recurrent neural network (RNN), a deep neural network (DNN), a convolutional neural network (CNN), etc. The ML assets 230 also comprise client configuration data 234. The client configuration data 234 comprises identifiers for features from a predefined set of features that were used to train the ML model 232, as well as transformations that transform values of the features into input values that can be input to the ML model 232. In an example, the transformations may include capping (e.g., setting a value that is less than zero to zero), summing (e.g., adding different values, such as mouse and keyboard inputs), and dividing (e.g., dividing an amount of user activity in a first time period by user activity in a second time period). The transformations may also include data type conversions (e.g., float to double) and syntax conversion of identifiers for the features (e.g., "number of mouse clicks" to "number_clicks"). The client configuration data 234 may also specify a type of the ML model 232 (e.g., a gradient boosted tree) and information required to execute the ML model 232 (e.g., a minimum version of an ML library/ML runtime). Furthermore, the client configuration data 234 may also specify a minimum version of a target application that the ML model 232 is compatible with.

Additionally, the data store 220 comprises model configuration data 236 for the ML model 232. The model configuration data 236 specifies model training parameters that are to be used by the ML development platform 210 to train the ML model 232. In an example, the model configuration data 236 can include model training parameters (also known as hyperparameters) such as a number of training iterations, a number of nodes in a hidden layer, a number of hidden layers in a neural network, and the like. The model configuration data 236 may also include some or all of the transformations that are specified in the client configuration data 234; however, it is to be understood that the model configuration data 236 may include transformations that are not included in the client configuration data 234. More specifically, the model configuration data 236 may include transformations that are not included in the client configuration data 234, but the transformations in the model client configuration data 234 and the model configuration data 236 are to match in order for the ML model 232 to be able to be executed by a client computing device.

The data store 220 also may also comprise telemetry data 238 that has been transmitted to the ML development platform 210 from different computing devices. The telemetry data 238 is indicative of whether or not the ML model 232 output correct predictions when the ML model 232 was executed by the different computing devices.

Figure 4:
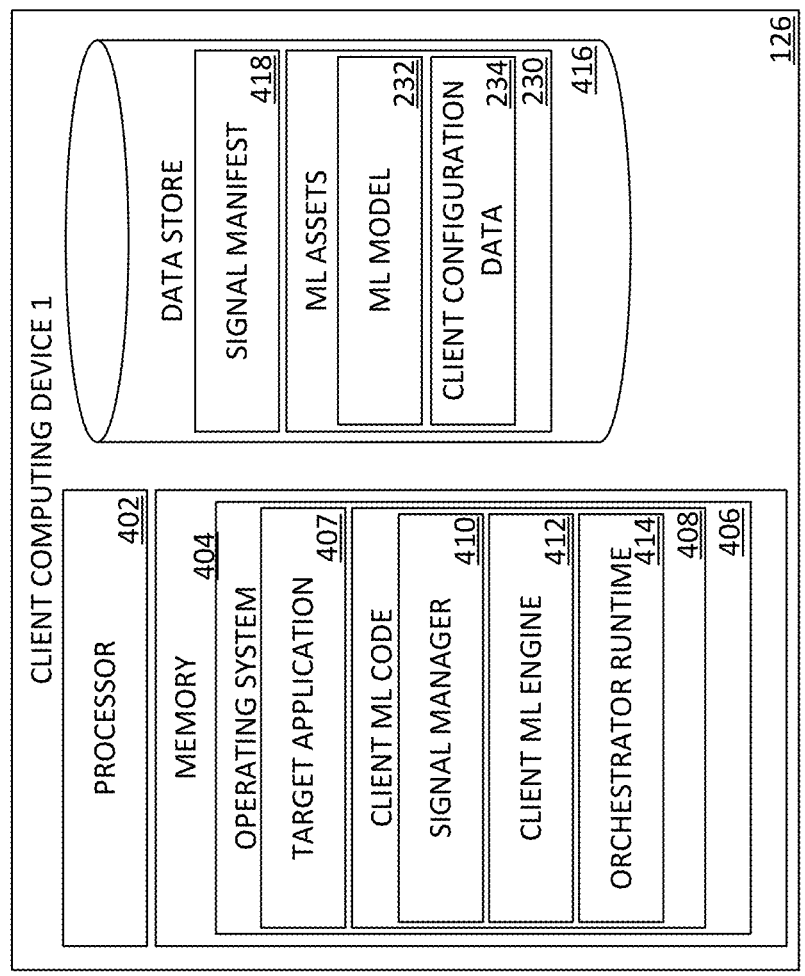
FIG. 4 is a functional block diagram of an exemplary computing system that facilitates training, deploying, executing, and updating ML models.

Referring now to FIG. 4, a functional block diagram that illustrates componentry of the first client computing device 126 is illustrated. The first client computing device 126 comprises a processor 402 and memory 404, wherein the memory 404 has an operating system 406 loaded therein. The operating system 406, when executed by the processor 402, is configured to manage hardware and software resources of the first client computing device 126. The memory 404 additionally has the target application 407 (that corresponds to the source code 114) loaded therein, wherein the target application 407 is an executable that is executed by the processor 402 (in contrast to the source code 114).

The memory 404 further comprises client ML code 408. Briefly, the client ML code 408 is accessible to the target application 407, and the client ML code 408 is configured to execute the ML model 232 and return a prediction to the target application 407. The client ML code 408 comprises a signal manager 410. The signal manager 410 is configured to monitor and/or record signals produced by the first client computing device 126, wherein the signals include values that are to be transformed into input values that can be provided to the ML model 232 as input. In an embodiment, the signal manager 410 may operate as a background service of the operating system 406. In another embodiment, the signal manager 410 may integrate with existing components of the first client computing device 126 which monitor and/or record signals for other purposes.

The client ML code 410 also comprises a client ML engine 412. The client ML engine 412 comprises various ML libraries and ML runtimes that facilitate executing the ML model 232. In an embodiment, the client ML engine 412 may be a runtime dynamic-link library (DLL) that the first client computing device 126 may load into a context of the target application 407.

Figure 5:
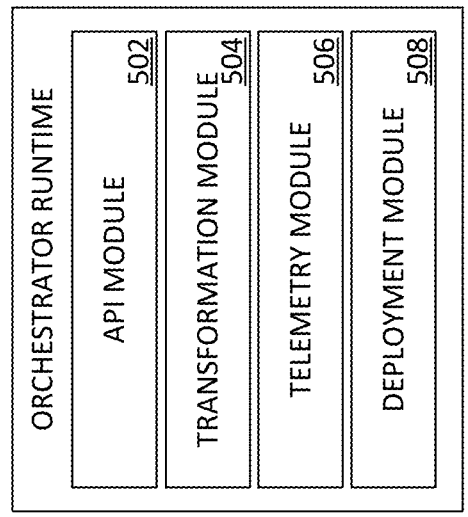
FIG. 5 is a functional block diagram of an orchestrator runtime that orchestrates execution of a ML model.

The client ML code 410 further comprises an orchestrator runtime 414. Referring briefly now to FIG. 5, a functional block diagram of the orchestrator runtime 414 is illustrated. The orchestrator runtime 414 comprises an application programming interface (API) module 502 that provides a prediction API, the prediction API configured to process an API call from the target application 407, wherein the API call is a request for a prediction from the ML model 232. The orchestrator runtime 414 further comprises a transformation module 504 that is configured to apply transformations to values produced by the first client computing device 126 in order to generate input values that can be provided to the ML model 232 as input. The orchestrator runtime 414 additionally comprises a telemetry module 506. The telemetry module 506 is configured to generate and transmit the telemetry data 238 to the server computing device 124, which can be utilized by the ML development platform 210 to optimize the ML model 232. The orchestrator runtime 414 also comprises a deployment module 508 that facilitates deployment of the ML model 232 onto the first client computing device 126. In an embodiment, the orchestrator runtime 414 may be a runtime DLL that the first client computing device 126 may load into a context of the target application 407.

Returning to FIG. 4, the first client computing device 126 further includes a data store 416. The data store 416 comprises a signal manifest 418. The signal manifest 418 includes identifiers for signals that are to be monitored for by the signal manager 410 of the client ML code 408, wherein the signals include values produced by the first client computing device 126 that may form the basis of input to the ML model 232. The data store 416 also stores the ML assets 230 (including the ML model 232 and the client configuration data 234) described above in the description of FIG. 2. Although not shown in FIG. 4, the first client computing device 126 may also include a display and input components.

While not shown, the Nth client computing device 128 may comprise hardware and software components similar or identical to the first client computing device 126. It is to be understood that the client computing devices 126-128 may include any number of client computing devices. Additionally, it is to be understood that the developer computing device 102 may be included in the client computing devices 126-128.

Operation of the computing system 100 is now described with reference to FIGS. 1-5. The software developer 130 is a developer of the target application 407 and wishes to add ML functionality to the target application 407. As such, the developer computing device 102 receives an indication from the software developer 130 that a ML model is to be built for the target application 407. For instance, the ML plugin 110 of the software development application 108 may provide the software developer 130 with a selectable button that facilitates addition of the ML functionality to the target application 407. Responsive to receiving a selection of the button, the developer computing device 102 transmits a message to the server computing device 124, the message indicating that a scenario is to be registered, wherein the scenario pertains to a prediction that is to be generated by the ML model.

In an embodiment, the selection of the selectable button causes the developer computing device 102 to add an entry containing the scenario identifier to a computer-readable file (e.g., a text file, a JavaScript Object Notation (JSON) file, an Extensible Markup Language (XML) file, etc.). The file comprises a manifest of scenarios implemented in the target application 407. The file may be considered part of the source code of the target application 407 and may be edited within a text editor that executes on the developer computing device 102. A tool executing on the developer computing device 102 (e.g., a tool provided by the ML plugin 110 of the software development application 108 or the ML development platform 210) processes the file and outputs artifacts (e.g., header files, such as a C++ header file) that are to be consumed by or compiled with the source code. The artifacts define the prediction API described above and associated program constructs (e.g., classes, functions) which are specific to the scenario identified by the scenario identifier. The software developer 130 may then add program code to the target application 407 which interacts with the program constructs (e.g., calling a function) which in turns provides the scenario identifier to the client ML code 408 and returns a result to the target application 407. The developer computing device 102 may transmit the file to the server computing device 124, which in turn may provide a user interface to the developer computing device 102 for triggering creation of, management of, and evaluation of real-world performance of ML models associated with the scenario identified in the scenario identifier. The server computing device 124 may track changes to the file to change a type of ML model produced for the scenario, and optionally to support maintenance of multiple models, for instance, a first ML model compatible with a first version of the target application 407 and a second ML model compatible with a second version of the target application 407. In another embodiment, selection of the selectable button adds code to source code of the target application 407 which references the prediction API described above, where the scenario identifier is incorporated directly into the source code of the target application 407 as a parameter passed via the prediction API.

Responsive to receiving the message, the ML development platform 210 generates a scenario identifier and transmits the scenario identifier to the developer computing device 102. Alternatively, the scenario identifier can be provided by the software developer 130. The scenario identifier can incorporate a version identifier that identifies a version of an ML model, wherein the version identifier facilitates comparison of different versions of ML models trained at different times with different configurations and is useful in establishing a feedback loop for experimentation. The ML development platform 210 also provides the developer computing device 102 with access to the file(s) 222. For instance, the server computing device 124 may transmit the file(s) 222 (or a portion thereof) to the developer computing device 102, whereupon the developer computing device 102 can present the file(s) 222 (or portions thereof) on the display 116. It is to be understood that the file(s) 222 are not stored long-term on the developer computing device 102. The developer computing device 102 receives a selection from the software developer 130 of a client computing device in the file(s) 222 that has a state that is relevant to the scenario. Alternatively, a different individual may perform the selection of the file(s) 222, such as a data engineer or a data and applied scientist. The developer computing device 102 also receives a selection of a timestamp for the selected client computing device, wherein the timestamp represents a time when it would have been desirable for an ML model to generate a prediction. This process can be repeated so that several client computing devices and timestamps are selected. For instance, the software developer 130 may author a script which automates the process, and the developer computing device 102 may execute the script. In an embodiment, the developer computing device 102 can receive, as input from the software developer 130, an indication of a type of ML model that is to be generated or an indication of a type of output (e.g., classification, regression, etc.) that is to be output by the ML model.

For each timestamp selected by the developer 130, the developer computing device 102 causes a label to be assigned that identifies a desired prediction. In one embodiment, the developer computing device 102 may receive the label as manual input from the software developer 130. In another embodiment, the ML development platform 210 may support the automatic assignation of the label. Subsequent to labeling the timestamps of the files, the developer computing device 102 transmits identities of the files, the timestamps, and the labels to the ML development platform 210.

Subsequent to receiving the scenario identifier from the ML development platform 210, the software development application 108 receives input from the software developer 130 which causes the target application code 114 of the target application 407 to be updated to include a call to the prediction API provided by the client ML code 408. The target application code 114 can be compiled and deployed to the client computing devices 126-128 subsequent to the ML model 232 being trained. Alternatively, in an embodiment, the target application code 114 can specify a default mode of operation if the ML model 232 is not yet available. The target application code 114 can change its operation when the ML model 232 is deployed. This embodiment is useful as deployment of the target application 407 without the ML model 232 enables useful training data to be collected by the client computing devices 126-128.

The ML development platform 210 receives the identities of the selected client computing devices from the file(s), the timestamps, and the labels from the developer computing device 102. The ML development platform 210 generates the training data 224 that is to be utilized to train the ML model 232. More specifically, for each label received from the developer computing device 102, the ML development platform 210 generates values for the predefined set of features based upon data in the file(s) 222. The predefined set of features may include, but are not limited to, world state (date, time) device state (power source, connectivity), device characteristics (form factor, screen size), user characteristics (age, account type), user/operating system/application states (identity of an active application, identities of background applications, an amount of time since the user logged into the device), and user/operating system/application history (keystrokes, patterns of input, mouse clicks, etc.). The predefined set of features can be extended to include more features over time. Additionally, for each label, the ML development platform 210 may also perform predefined transformations (described above) upon the values to generate training values that can be used to train the ML model 232. The NIL development platform 210 can employ heuristics or other suitable approaches to identify the features that are to be used to train the ML model 232. In an embodiment, the features and/or transformations may be specified by the software developer 130 such that the features and/or transformations are different than the predefined set of features and/or the predefined transformations.

Subsequent to generating the training data 224, the ML development platform 210 generates the ML assets 230. More specifically, the ML development platform 210 trains the ML model 232 based upon the training values 226, the labels 228 assigned thereto, and the model configuration data 236. Upon the ML model 232 being trained, the ML development platform 210 also generates diagnostic information for the ML model 232 that is indicative of the importance of each feature in the features 226 in generating correct predictions. For instance, as noted above, the diagnostic information may include AUC and partial dependency plots. Based upon the diagnostic information, the ML development platform 210, in response to input from the developer 130, may update the features 226 (e.g., remove a feature, add a feature from the predefined set of features, etc.) and retrain the ML model 232.

Subsequent to training the ML model 232 and generating the client configuration data 234, the server computing device 124 securely deploys the ML assets 230 to the client computing devices 126-128. In an embodiment, the server computing device 124 may securely deploy the ML assets 230 to each of the client computing devices 126-128 as part of an operating system update to each of the client computing devices 126-128. In the embodiment, the server computing device 124 digitally signs, packages, and uploads the ML assets 230 to a distribution endpoint. The client computing devices 126-128 may download the ML assets 230 from the distribution endpoint via a secure deployment channel. The client computing devices 126-128 then execute the ML model 232 in the ML assets 230 in order to generate predictions that can be utilized by the target application 407 executing on each of the client computing devices 126-128.

In an example, the server computing device 124 causes the ML assets 230 to be securely deployed to the first client computing device 126 (i.e., the first client computing device 126 securely retrieves the ML assets 230 from the server computing device 124). When the target application 114 executes on the first client computing device 126, the target application 114 reaches a point of execution where the prediction that is to be provided by the ML model 232 is to be utilized. The target application 114 performs an API call to the prediction API provided by the client ML code 408. The call comprises the scenario identifier for the ML model 232 (which, as noted above, has been included in the code for the target application 407). Responsive to receiving the call, the client ML code 408 locates the ML assets 230. If the client ML code 408 cannot locate the ML assets 230, the client ML code 408 may return an error or a default value. The client ML code 408 acquires, via the signal manager 410, values for the features identified in the client configuration data 234 of the ML assets 230, the values having been produced by the first client computing device 126. For instance, the client ML code 408 can acquire the values for the features based upon contents of a log file stored on the first client computing device 126 and/or from contents of the memory 404 of the first client computing device 126. Responsive to acquiring the values, the client ML code 408 performs the transformations as specified by the client configuration data 234 to transform the values into input values. The client ML code 408 then executes the ML model 232. For instance, the client ML code 408 loads the ML model 232 and provides the input values to the ML model 232 as input. The ML model 232 outputs a prediction based upon the input values. Based upon output of the prediction, the client ML code 408 returns the prediction to the target application 407, whereupon the target application 407 performs an action based upon the prediction. For instance, in an example, the prediction may be a first value or a second value. When the prediction is the first value, the target application 407 performs a first action. In contrast, when the prediction is the second value, the target application 407 performs a second action. In another example, the target application 407 performs the first action when a value of the prediction is above a threshold value and the target application 407 performs the second action when the value of the prediction is below the threshold value.

It is to be understood that the prediction API may be utilized entirely locally using values produced at the first client computing device 126 at a time when the prediction is to be made. As a result, the first client computing device 126 can utilize the prediction API without communicating with an external computing device, such as the server computing device 124. Moreover, it is also to be understood that code of target application code 114 of the target application 407 is decoupled from the client ML 408 such that the ML assets 230 can be updated and improved without changes to the code of the target application 114.

Subsequent to output of the prediction, the client NIL code 408 may be configured to generate and transmit the telemetry data 238 to the ML development platform 210. The ML development platform 210 can evaluate and retrain the ML model based upon the telemetry data 238. In an example, the telemetry data 238 may include values for some or all of the features specified in the client configuration data 234 that were produced by the first client computing device 126, an identity of the prediction output by the ML model 232, and user feedback (including ground truth values) collected about the prediction. The telemetry data 238 may exclude certain features based upon privacy settings of the first client computing device 126. The ML development platform 210 can automatically retrain the ML model 232 based upon the telemetry data 238, evaluate the retrained ML model 232 as described above, and redeploy updated ML assets (which include retrained ML model 232 and, optionally, an updated version of the client configuration data 234) to each of the client computing devices 126-128. Notably, the code for the API call in the target application 407 does not need to be changed to account for the retrained ML model, as the target application 407 performs the API call using the scenario identifier, which does not change when the ML model 232 is updated.

In an example, the ML development platform 210 may remove a feature from the features 226 that were used to train the ML model 232. In another example, the ML development platform 210 may add a feature to the features 226, the feature being a feature from the predefined set of features that was not initially used to train the ML model 232. The ML development platform 210 may retrain the ML model 232 using the updated features. Additionally, the ML development platform 210 may update the client configuration data 234 to account for the removed or newly added features.

In an embodiment, subsequent to updating the ML assets 230, the ML development platform 210 can deploy the updated ML assets to a first portion of the client computing devices 126-128 while leaving a second portion of the client computing device 126-128 with the (original) ML assets 230. The first portion of client computing devices 126-128 execute an updated ML model in the updated ML assets and produce first telemetry data that is indicative of whether the updated ML model generated correct predictions when executed by the first portion of client computing devices 126-128. The second portion of client computing devices 126-128 continue to execute the ML model 232 and produce second telemetry data that is indicative of whether the ML model 232 generated corrected predictions when executed by the second portion of client computing devices 126-128. The ML development platform 210 may assess performance of the updated ML assets based upon a comparison between the first telemetry data and the second telemetry data. When the comparison indicates that the updated ML model in the updated ML assets generated correct predictions at a greater frequency that the (original) ML model 232, the ML development platform 210 can deploy the updated ML assets to the second portion of client computing devices 126-128. Alternatively, when the comparison indicates that the updated ML model in the updated ML assets generated correct predictions at a lower frequency that the (original) ML model 232, the ML development platform can redeploy the (original) ML model 232 to the first portion of client computing devices 126-128.

In an embodiment, the target application 407 may be configured with code that calls a second API to resolve a prediction generated via the prediction API. In the embodiment, the prediction API described above returns both the prediction and a unique identifier corresponding to the prediction. The unique identifier is included in telemetry data which records the features that were as input to the ML model 232 and a result of the prediction. The target application 407 can further include code that can observe a true outcome of the predicted event. The target application 407 can call the second API providing both the unique identifier and the observed outcome. This results in the generation of further telemetry data which can be used as new, labeled training data for training an improved ML model.

The process of receiving the telemetry data 238, retraining the ML model 232, and redeploying the retrained ML model 232 may be repeated any number of times such that the ML model 232 is continually improved and/or adapts to observed user behavior. Tus, the computing system 100 provides a loop that enables ML functionality to be added to the target application 114 with minimal effort on the part of the software developer 130.

In an embodiment, the ML development platform 210 may perform experiments with respect to the ML model 232 to determine the effectiveness of the ML functionality provided by the ML model 232. In one example, A/B (i.e., on or off or known working ML model vs. candidate replacement ML model) tests may be performed. The ML development platform 210 may divide the client computing devices 126-128 into a first subset and a second subset. The ML development platform 210 may deploy the ML model 232 to the first subset, but not the second subset. The ML development platform 210 may receive data from the first subset and the second subset, and the ML development platform 210 may evaluate performance of the ML model 232 based upon the data. The ML development platform 210 may also perform reverse A/B tests to further validate the effectiveness of the ML model 232.

In another example, the ML development platform 210 may perform A/B/C tests to test different configurations (e.g., different types of ML models, varying triggering thresholds within the same type of ML model, etc.) of the ML model 232. For instance, the ML development platform 210 may train a second ML model based upon the training data 224, wherein the second ML model is different from the ML model 232 (e.g., different characteristics, a different type of ML model, different input features, etc.). The ML development platform 210 may then deploy the ML model 232 to a first portion of the client computing devices 126-128 and the second ML model to a second portion of the client computing device 126-128. The ML development platform 210 may receive first telemetry data from the first portion of client computing devices 126-128 and second telemetry data from the second portion of the client computing devices 126-128. The ML development platform 210 may perform a comparison between first telemetry data and the second telemetry in order to determine whether the ML model 232 or the second ML model generated more accurate predictions. The ML development platform 210 may deploy the second ML model to the first portion of the client computing devices 126-128 or the ML model 232 to the second portion of the client computing devices 126-128 based upon the comparison.

In an embodiment, the ML development platform 210 may deploy ML models to randomized control groups (i.e., random groups of the client computing devices 126-128) in order to make causal inference comparisons. In an embodiment, the ML development platform 210 may receive qualitative user feedback from users of the client computing devices 126-128. The ML development platform 210 may additionally update the ML model 232 based upon the qualitative user feedback.

In an embodiment, each of the client computing devices 126-128 may periodically query the ML development platform 210 to check if an updated version of the ML model 232 is available. When an updated version of the ML model 232 is available, the ML development platform 210 may transmit the updated version of the ML model 232 to each of the client computing devices 126-128, and each of the client computing device 126-128 may overwrite the previous version of the ML model 232 with the updated version of the ML model 232.

Although the ML development platform 210 has been described as facilitating training, deployment, execution, and updating of a ML model in a supervised learning approach, other possibilities are contemplated. For instance, the ML development platform 210 may be used in semi-supervised (including reinforcement learning) and unsupervised approaches as well, without changing the prediction API or the way the software developer 130 interacts with the ML development platform 210. Additionally, although the ML development platform 210 has been described as facilitating training, deployment, execution, and updating of a classification based ML model, other possibilities are contemplated. For instance, the ML development platform 210 may be used to train regression models, clustering models, etc.

While the ML assets 230 have been described above as being deployed to client computing devices, it is to be understood that portions of the ML assets 230 may be deployed on an application server that is in network communication with the client computing devices. For example, if the ML model 232 is relatively large or requires a significant amount of computing resources, the ML model 232 can be stored and executed at an application server. Thus, when the target application 407 calls the prediction API, the signal manager 410 acquires appropriate feature values and transmits such values to the application server. Transformations can be performed at either the client device or the application server, and the ML model 232 is provided with appropriate input. The application server can generate a prediction, and the application server can transmit the prediction to the client device, whereupon the target application performs an action based upon such prediction. In this scenario, at least some of the functionality of the client ML engine 412 can be performed at the application server. Other architectures, where functionality is split between client devices and server devices, are also contemplated.

FIGS. 6-9 illustrate exemplary methodologies relating to training, deployment, execution, and updating of ML models. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 6:
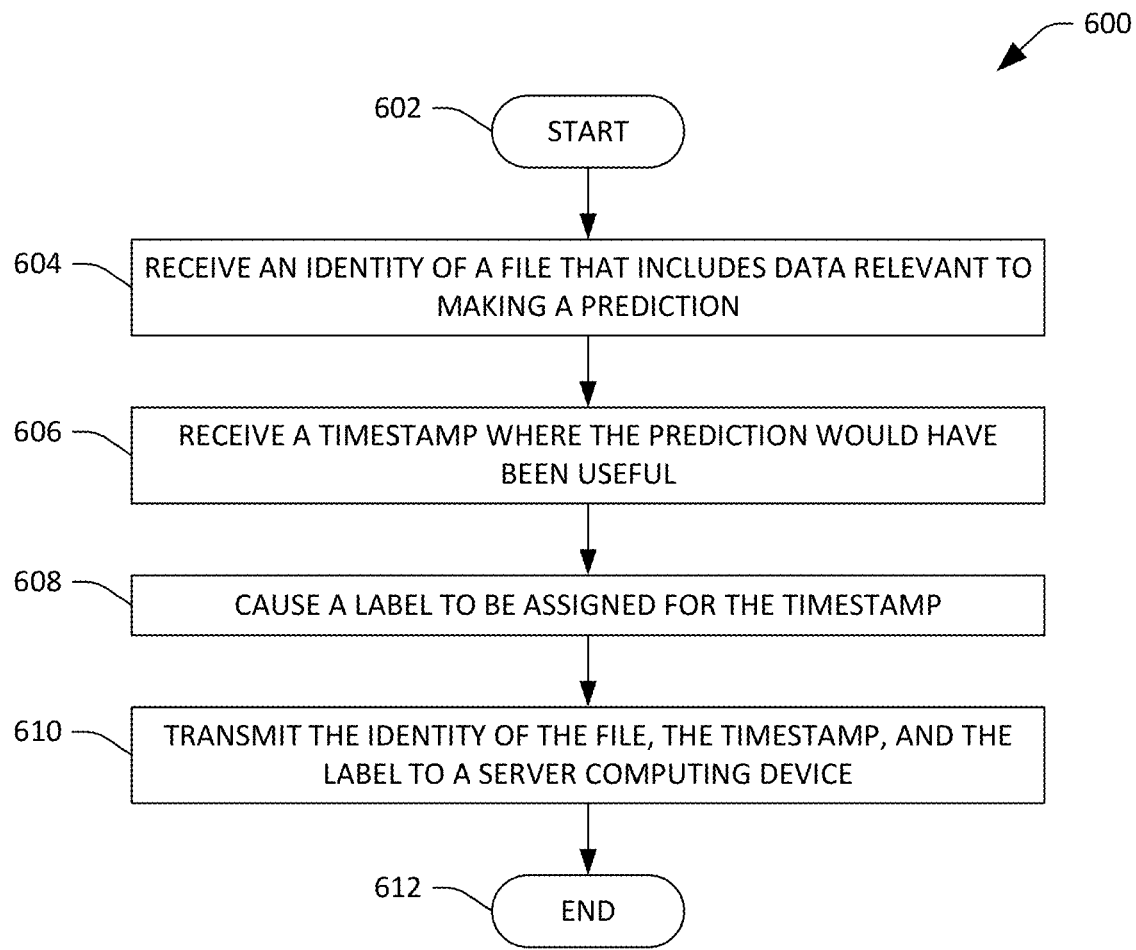
FIG. 6 is a flow diagram that illustrates an exemplary methodology performed by a developer computing device that facilitates generating a ML model.

Turning now to FIG. 6, a methodology 600 executed by a developer computing device that facilitates generating a ML model is illustrated. The methodology 600 begins at 602, and at 604, the developer computing device receives, from a software developer, an identity of a file that includes data that is relevant to making a prediction. At 606, the developer computing device receives, from the software developer, a timestamp where the prediction would have been useful. At 608, the developer computing device causes a label to be assigned for the timestamp, the label identifying the prediction. At 610, the developer computing device transmits the identity of the file, the timestamp, and the label to a server computing device, wherein the server computing device causes the ML model to be generated based upon the scenario definition, the identity of the file, the timestamp, and the label. The methodology 600 concludes at 612.

Figure 7:
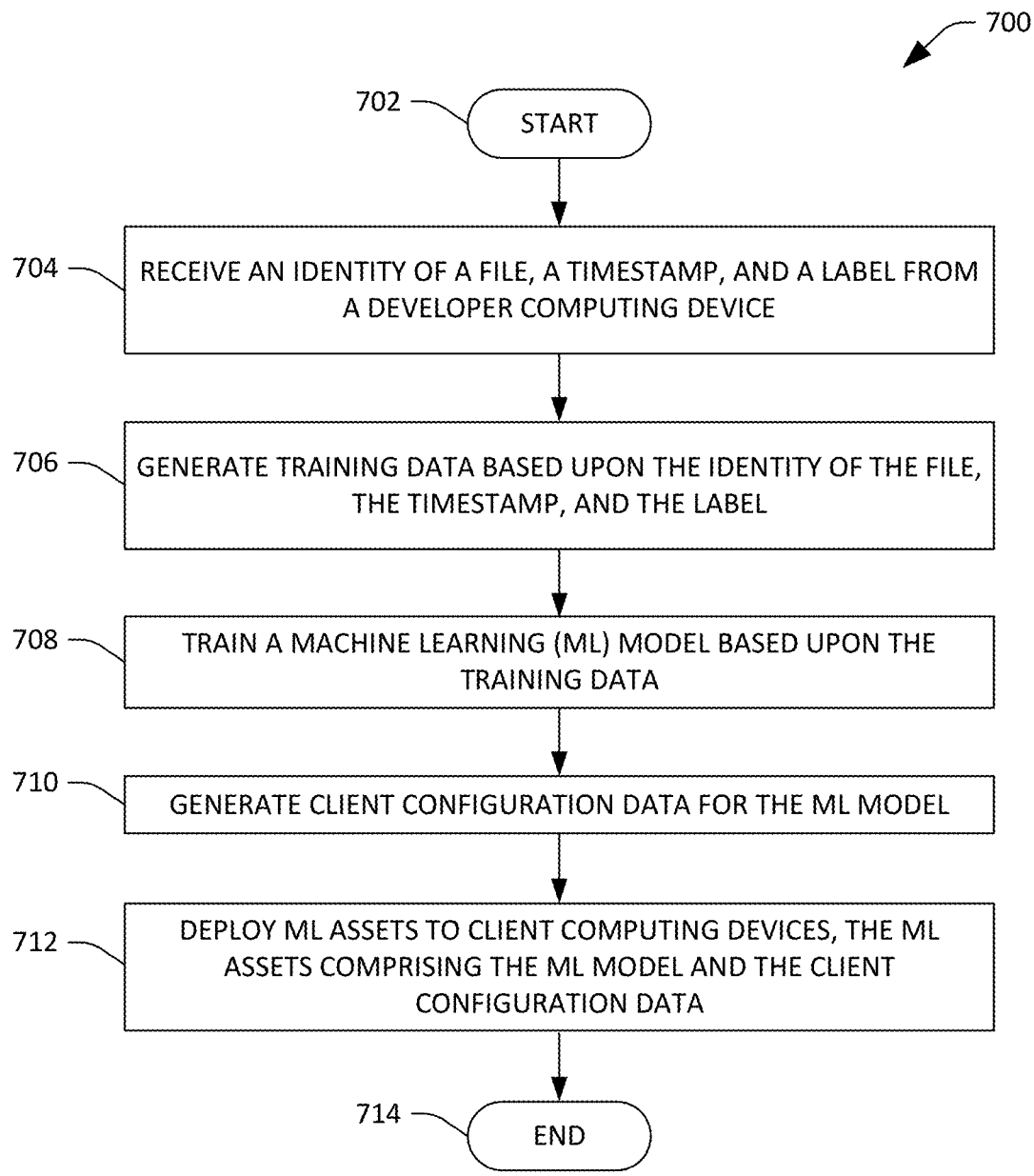
FIG. 7 is a flow diagram that illustrates an exemplary methodology performed by a server computing device that facilitates training and deploying a ML model.

Referring now to FIG. 7, a methodology 700 executed by a server computing device that facilitates training and deploying a ML model is illustrated. The methodology 700 begins at 702, and at 704, the server computing device receives, from a developer computing device, an identity of the file, a timestamp, and a label. At 706, the server computing device generates training data based upon the identity of the file, the timestamp, and the label, wherein the training data is to be utilized to train the ML model. At 708, the server computing device trains the ML model based upon the training data. At 710, the server computing device generates client configuration data for the ML model, the client configuration data comprising transformations that are to be applied to values in order to generate input values that can be input to the ML model. At 712, the server computing device deploys ML assets to client computing devices, the ML assets comprising the ML model and the client configuration data. The methodology 700 concludes at 714.

Figure 8:
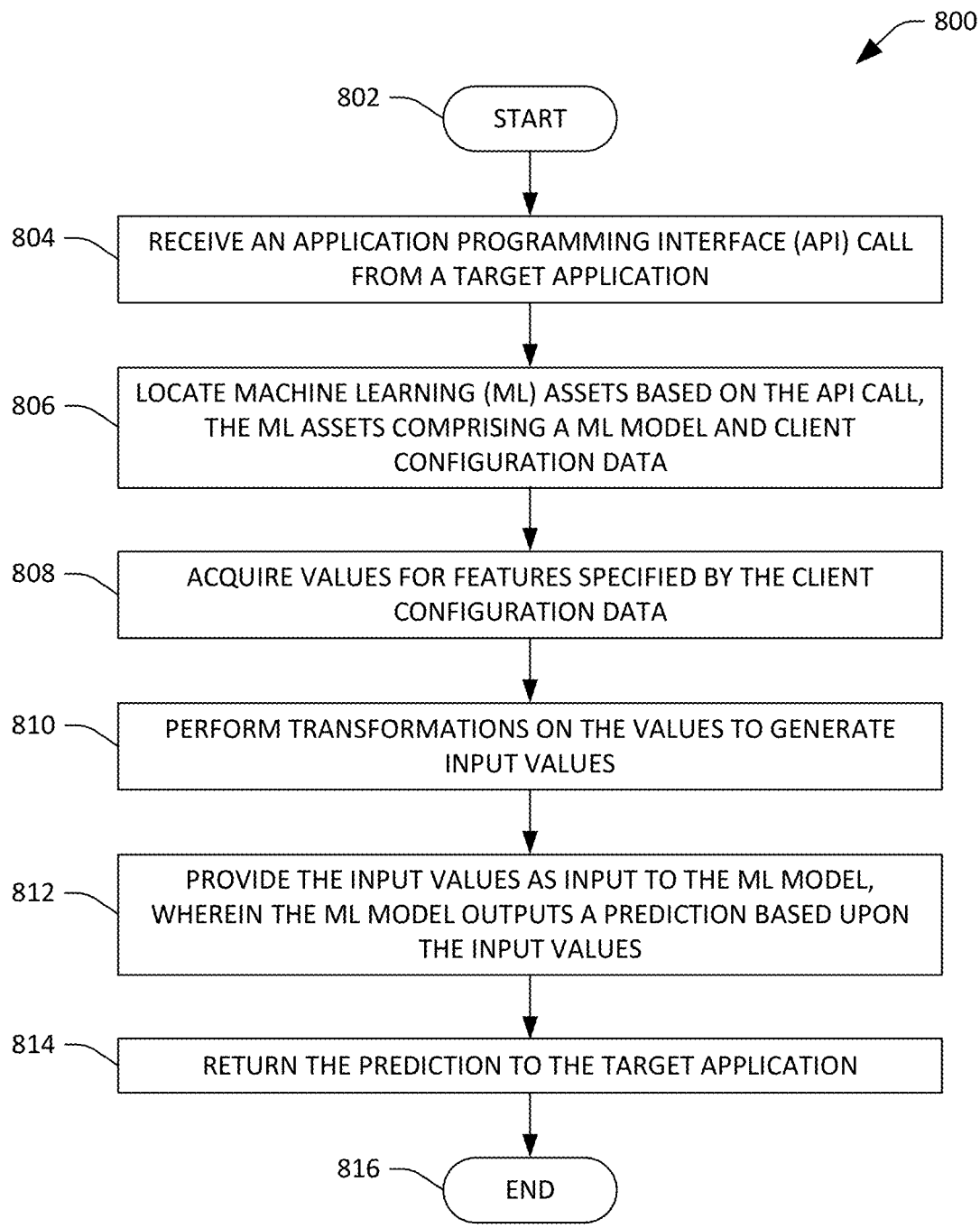
FIG. 8 is a flow diagram that illustrates an exemplary methodology performed by a client computing device that facilitates executing a ML model.

With reference now to FIG. 8, a methodology 800 executed by a client computing device that facilitates executing a ML model is illustrated. The methodology 800 begins at 802, and at 804, client ML code executing on the client computing device receives an API call from a target application also executing on the client computing device, the API call comprising a scenario identifier. At 806, the client ML code locates ML assets based on the API call, the ML assets comprising a ML model and client configuration data. At 808, the client ML code acquires values for features specified by the client configuration data, wherein the values are produced by the client computing device. At 810, the client ML code performs transformations on the values to generate input values, the transformations being specified in the client configuration data. At 812, the client ML code provides the input values as input to the ML model, wherein the ML model outputs a prediction based upon the input values. At 814, the client ML code returns the prediction to the target application. The methodology 800 concludes at 816.

Figure 9:
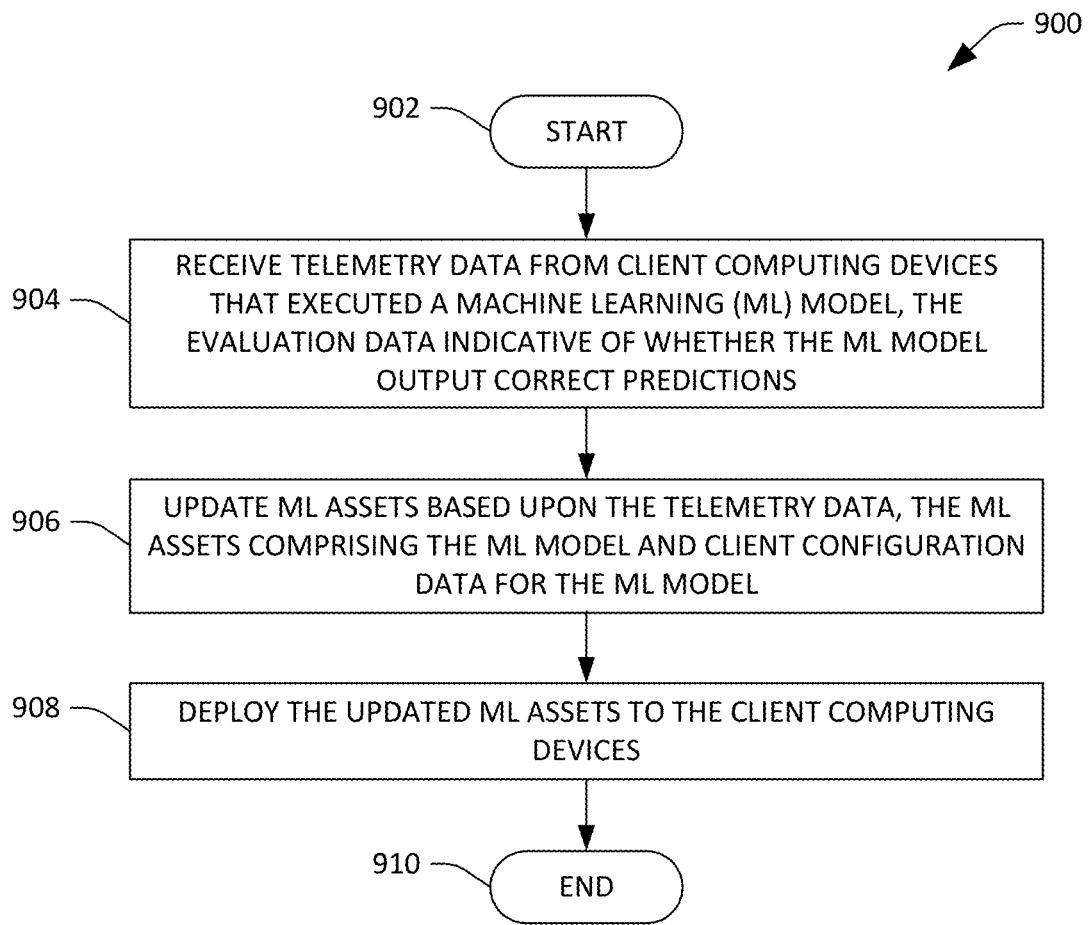
FIG. 9 is a flow diagram that illustrates an exemplary methodology performed by a server computing device that facilitates updating a ML model.

Turning now to FIG. 9, a methodology 900 executed by a server computing device that facilitates updating a ML model trained by the server computing device is illustrated. The methodology 900 begins at 902, and at 904, the server computing device receives telemetry data from client computing devices that executed the ML model. The telemetry data is indicative of whether the ML model output correct predictions when executed by the client computing devices. At 906, the server computing devices updates ML assets based upon the telemetry data received from the client computing devices, the ML assets comprising the ML model and the client configuration data. At 908, the server computing device deploys the updated ML assets to the client computing devices. The methodology 900 concludes at 910.

Figure 10:
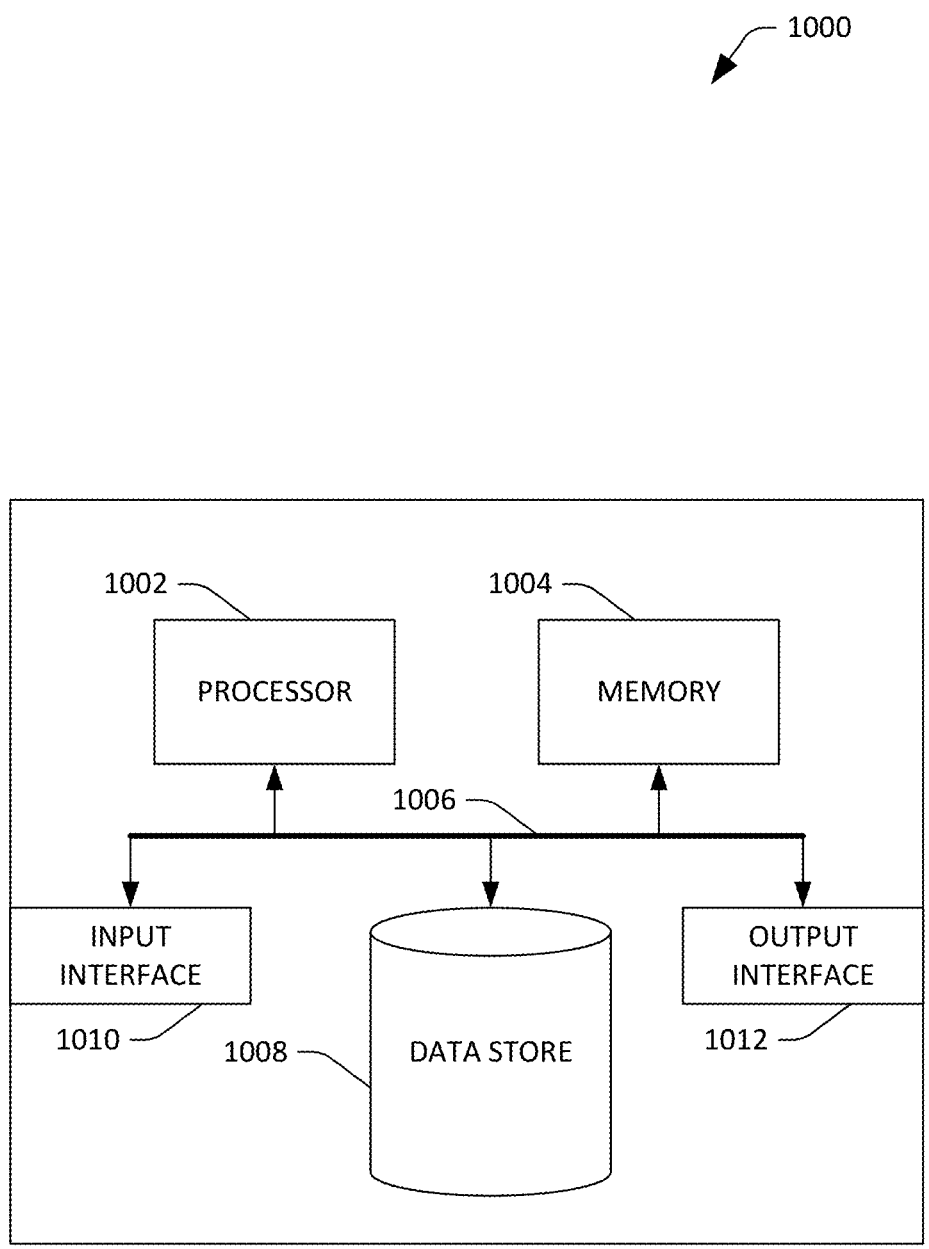
FIG. 10 is an exemplary computing device.

Referring now to FIG. 10, a high-level illustration of an exemplary computing device 1000 that can be used in accordance with the systems and methodologies disclosed herein is illustrated. For instance, the computing device 1000 may be used in a system that trains a ML model. By way of another example, the computing device 1000 can be used in a system that executes a ML model in order to generate a prediction. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store files, training data (including features and labels assigned thereto). ML assets (including ML models and client configuration data), model configuration data, telemetry data, etc.

The computing device 1000 additionally includes a data store 1008 that is accessible by the processor 1002 by way of the system bus 1006. The data store 1008 may include executable instructions, files, training data (including features and labels assigned thereto), NIL assets (including ML models and client configuration data), model configuration data, telemetry data, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Figure 11:
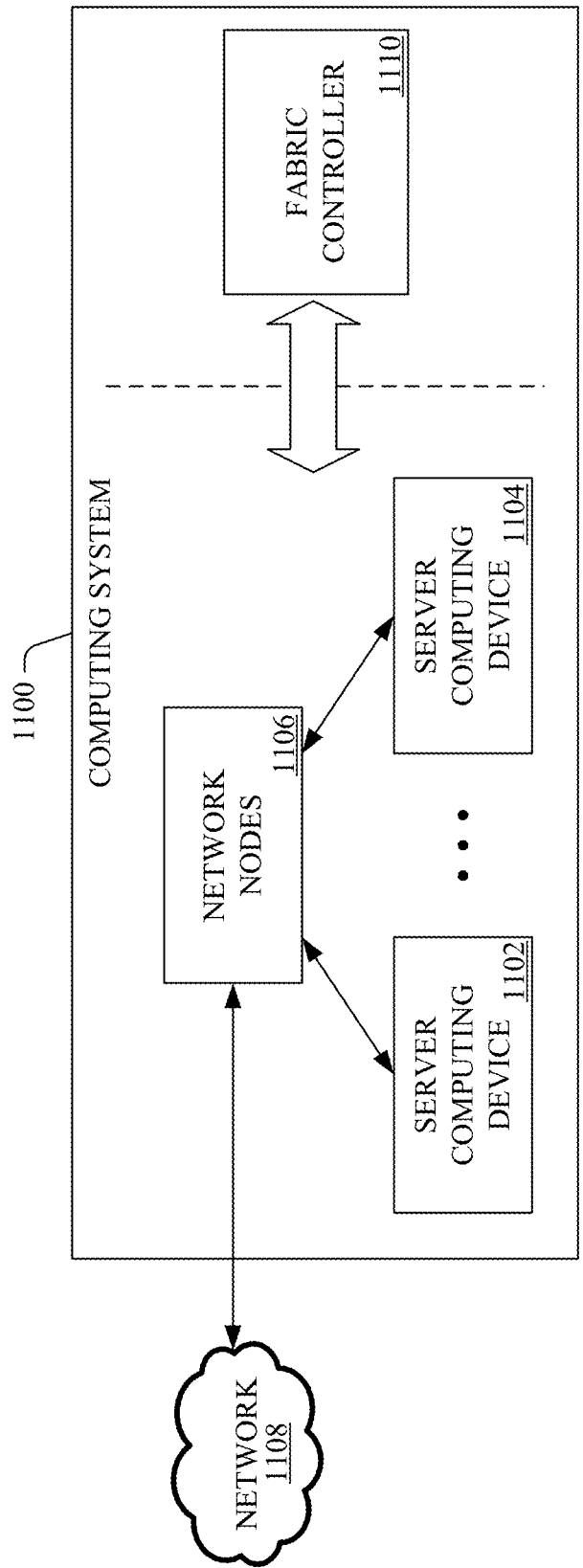
FIG. 11 is an exemplary computing system.

With reference now to FIG. 11, a high-level illustration of an exemplary computing system 1100 that can be used in accordance with the systems and methodologies disclosed herein is illustrated. For instance, the computing system 1100 can be or include the server computing device 124. Additionally or alternatively, the server computing device 124 can be or include the computing system 1100.

The computing system 1100 includes a plurality of server computing devices, namely, a server computing device 1102, . . . , and a server computing device 1104 (collectively referred to as server computing devices 1102-1104). The server computing device 1102 includes at least one processor and a memory; the at least one processor executes instructions that are stored in the memory. The instructions may be, for instance, instructions for implementing functionality described as being carried out by one or more components discussed above or instructions for implementing one or more of the methods described above. Similar to the server computing device 1104, at least a subset of the server computing devices 1102-1104 other than the server computing device 1102 each respectively include at least one processor and a memory. Moreover, at least a subset of the server computing devices 1102-1104 include respective data stores.

Processor(s) of one or more of the server computing devices 1102-1104 can be or include the processors 202. Further, a memory (or memories) of one or more of the server computing devices 1102-1104 can be or include the memory 208. Moreover, a data store (or data stores) of one or more of the server computing devices 1102-1104 can be or include the data store 220.

The computing system 1100 further includes various network nodes 1106 that transport data between the server computing devices 1102-1104. Moreover, the network nodes 1106 transport data from the server computing devices 1102-1104 to external nodes (e.g., external to the computing system 1100) by way of a network 1108. The network nodes 1106 also transport data to the server computing devices 1102-1104 from the external nodes by way of the network 1108. The network 1108, for example, can be the Internet, a cellular network, or the like. The network nodes 1106 include switches, routers, load balancers, and so forth.

A fabric controller 1110 of the computing system 1100 manages hardware resources of the server computing devices 1102-1104 (e.g., processors, memories, data stores, etc. of the server computing devices 1102-1104). The fabric controller 1110 further manages the network nodes 1106. Moreover, the fabric controller 1110 manages creation, provisioning, de-provisioning, and supervising of virtual machines instantiated upon the server computing devices 1102-1104.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A server computing device, comprising:

a processor; and memory storing instructions that, when executed by the processor, cause the processor to perform acts comprising:

receiving an identity of a file that includes an identifier for a device, a timestamp, and a label from a developer computing device, wherein the label identifies a prediction that is to be made, wherein a target application is to utilize the prediction;

generating training data based upon the identifier for the device, the timestamp, and the label, wherein generating the training data comprises generating values for a predefined set of features;

training a computer-implemented machine learning (ML) model based upon the training data, wherein the ML model is configured to take input values for client-generated features as input, wherein the ML model is configured to output the prediction based upon the input values;

generating client configuration data that comprises transformations that are to be applied to values produced by client computing devices in order to generate the input values;

deploying ML assets to the client computing devices, the ML assets comprising the ML model and the client configuration data, wherein the client computing devices transform the values produced by the client computing devices to the input values based upon the client configuration data, wherein the client computing devices provide the input values as input to the ML model, wherein the ML model outputs the prediction based upon the input values;

subsequent to deploying the ML assets to the client computing devices, updating the ML assets based upon telemetry data received from the client computing devices; and deploying the updated ML assets to a portion of the client computing devices, wherein the server computing device assesses performance of the updated ML assets based upon a comparison between the telemetry data and second telemetry data produced by the portion of the client computing devices when the portion of the client computing devices execute an updated ML model in the ML assets.

2. The server computing device of claim 1, wherein the client configuration data further comprises identifiers for features that are to be retrieved by the client computing device, wherein the client computing device retrieves the values for the features based upon the client configuration data.

3. The server computing device of claim 1, wherein a software developer is developing the target application on the developer computing device, wherein the developer computing device receives the identity of the file, the timestamp, and the label from the software developer.

4. The server computing device of claim 1, the acts further comprising:
assigning a scenario identifier to the ML assets.

5. The server computing device of claim 4, wherein the target application executes on a client computing device in the client computing devices, wherein the target application performs an application programming interface (API) call using the scenario identifier, wherein the API call causes the client computing device to execute the ML model.

6. The server computing device of claim 1, wherein a client computing device executes the ML model based upon input values produced locally at the client computing device, wherein the target application performs a first action when the prediction output by the ML model is above a threshold value, wherein the target application performs a second action when the prediction output by the ML model is below the threshold value.

7. The server computing device of claim 1, wherein updating the ML assets based upon the telemetry data comprises:
removing a feature from the predefined set of features; and
retraining the ML model based the predefined set of features with the feature removed therefrom.

8. The server computing device of claim 1, wherein the file includes a record of user input to the device received by the operating system of the device or a record of user input received by the target application.

9. The server computing device of claim 1, wherein the predefined set of features include patterns of input received by each of the client computing devices from users of each of the client computing devices.

10. A method executed by a processor of a server computing device, comprising:
receiving an identity of a file, a timestamp, and a label from a developer computing device, wherein the label identifies a prediction that is to be made, wherein a target application is to utilize the prediction;
generating training data based upon the identity of the file, the timestamp, and the label, wherein generating the training data comprises generating values for a predefined set of features;
training a computer-implemented machine learning (ML) model based upon the training data, wherein the ML model is configured to take input values for client-generated features as input, wherein the ML model is configured to output the prediction based upon the input values;
generating client configuration data that comprises transformations that are to be applied to values produced by client computing devices in order to generate the input values;
deploying ML assets to the client computing devices, the ML assets comprising the ML model and the client configuration data, wherein the client computing devices transform the values produced by the client computing devices to the input values based upon the client configuration data, wherein the client computing devices provide the input values as input to the ML model, wherein the ML model outputs the prediction based upon the input values;
subsequent to deploying the ML assets to the client computing devices, updating the ML assets based upon telemetry data received from the client computing devices; and
deploying the updated ML assets to a portion of the client computing devices, wherein the server computing device assesses performance of the updated ML assets based upon a comparison between the telemetry data and second telemetry data produced by the portion of the client computing devices when the portion of the client computing devices execute an updated ML model in the ML assets.

11. The method of claim 10, wherein updating the ML assets based upon the telemetry data comprises:
adding an additional feature to the predefined set of features; and
retraining the ML model based upon the predefined set of features that includes the additional feature.

12. The method of claim 10, wherein the predefined features include patterns of input received by each of the client computing devices from users of each of the client computing devices.

13. The method of claim 10, wherein the telemetry data comprises user feedback from users of the client computing devices, wherein updating the ML assets is further based upon the user feedback.

14. The method of claim 10, wherein the server computing device is a cloud-based computing platform.

15. The method of claim 10, wherein the ML assets are deployed to the client computing devices as part of an operating system update to the client computing devices.

16. The method of claim 10, further comprising:
when the comparison indicates that the updated ML model generated correct prediction at a greater frequency than the ML model, deploying the updated ML assets to client computing devices in the client computing devices that did not receive the updated ML assets.

17. A computer-readable storage medium comprising instructions that, when executed by a processor, cause the processor to perform acts comprising:
receiving an identity of a file that includes an identifier for a device, a timestamp, and a label from a developer computing device, wherein the label identifies a prediction that is to be made, where a target application is to utilize the prediction;
generating training data based upon the identifier for the device, the timestamp, and the label, wherein generating the training data comprises generating values for a predefined set of features;

training a computer-implemented machine learning (ML) model based upon the training data, wherein the ML model is configured to take input values for client-generated features as input, wherein the ML model is configured to output the prediction based upon the input values;

generating client configuration data that comprises transformations that are to be applied to values produced by client computing devices in order to generate the input values;

deploying ML assets to the client computing devices, the ML assets comprising the ML model and the client configuration data, wherein the client computing devices transform the values produced by the client computing devices to the input values based upon the client configuration data, wherein the client computing devices provide the input values as input to the ML model, wherein the ML model outputs the prediction based upon the input values;

subsequent to deploying the ML assets to the client computing devices, updating the ML assets based upon telemetry data received from the client computing devices; and deploying the updated ML assets to a portion of the client computing devices, wherein the server computing device assesses performance of the updated ML assets based upon a comparison between the telemetry data and second telemetry data produced by the portion of the client computing devices when the portion of the client computing devices execute an updated ML model in the ML assets.

18. The computer-readable storage medium of claim 17, wherein the target application performs an action based upon the prediction output by the ML model when the ML model is executed by a client computing device in the client computing devices.

19. The computer-readable storage medium of claim 17, wherein the ML assets are deployed to the client computing devices as part of an operating system update to the client computing devices.

20. The server computing device of claim 1, the acts further comprising:

deploying the updated ML assets to client computing devices in the client computing devices that did not receive the updated ML assets.

* * * * *